United States Patent [19]
Codina

[11] 3,727,082
[45] Apr. 10, 1973

[54] CODE CONVERTER

[75] Inventor: Jorge G. Codina, Hartsdale, N.Y.
[73] Assignee: Comard Controls Inc., New York, N.Y.

[22] Filed: Oct. 4, 1971
[21] Appl. No.: 185,969

[52] U.S. Cl. ....................307/265, 307/273, 332/9 T
[51] Int. Cl. ............................................H03k 17/00
[58] Field of Search......................307/273, 274, 265, 307/234; 332/1, 9 T, 510

[56] References Cited

UNITED STATES PATENTS 2,432,204 12/1947 Miller.....................................332/1
3,231,824 1/1966 Drapkin...............................332/9 X
3,443,118 5/1966 Rogers...............................307/273 X

*Primary Examiner*—John Zazworsky
*Assistant Examiner*—B. P. Davis
*Attorney*—Theodore Jay, Jr.

[57] ABSTRACT

Apparatus reservoir to a pulse duration modulation type incoming signal to derive therefrom a pulse position modulation type output signal. The apparatus includes a differentiation network responsive to the incoming signal, a one shot multivibrator to produce the output signal and means including two diode bearing paths having diodes of reversed polarity interposed between the network and the multivibrator.

1 Claim, 2 Drawing Figures

INVENTOR.
JORGE G. CODINA
BY Theodore Jay [signature]
ATTORNEY

CODE CONVERTER

SUMMARY OF THE INVENTION

As is well known, a pulse duration modulation signal can carry encoded information which is readily decoded by a suitable demodulator. However, both encoders and decoders so used use crystal controlled oscillators and filters and other expensive and complex components.

I have discovered that significant cost reductions both in the number and type of components can be obtained and indeed significant simplifications of circuit complexity can be made if the pulse duration modulation type signal is first transformed or converted to a pulse position modulation type signal prior to decoding.

To this end I employ apparatus responsive to a pulse duration modulation incoming signal which, typically, has first and second time displaced pulse components of the same polarity but which are independently variable in duration. The apparatus derives from the incoming signal a pulse position modulation type output signal which typically is a pulse train of three pulses of the same polarity. The first time period between the leading edges of the first and second pulses in the train is proportional to the duration of the first component. The second time period between the leading edges of the second and third pulses in the train is proportional to the duration of the second component.

The incoming signal is differentiated to produce a first spike of given polarity, then a pair of spikes, the first of which has reversed polarity, the second of which has the given polarity, then an additional spike of reversed polarity.

A single shot multivibrator is normally non-conductive and, when triggered into conduction, produces an output pulse of fixed duration much less than the duration of any component in the incoming signal.

Means interconnects the network and the multivibrator in such manner that the multivibrator is triggered successively by the first spike, the first spike in the pair and the additional spike whereby the desired pulse train is produced.

DETAILED DESCRIPTION OF PREFERRED EMBODIMENTS

Figure 1:
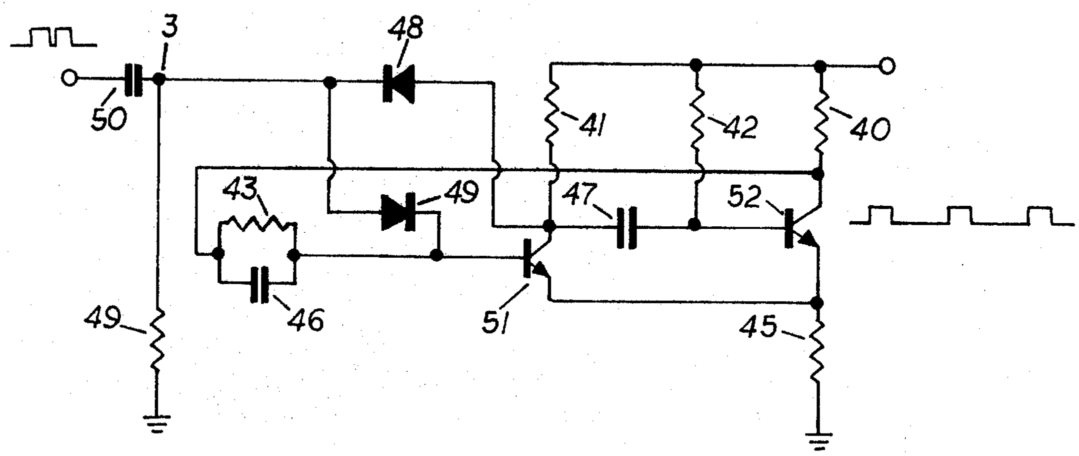
FIG. 1 is a circuit diagram of my invention.

Referring now to FIG. 1, an input terminal is connected through a capacitor 50 and resistor 44 to ground. The junction of this capacitor and resistor is connected first via diode 48 to the collector of transistor 51; and second via diode 49 to the base of transistor 51. The diodes have reversed polarity.

The collector of transistor 51 is connected via resistor 41 to a point of positive potential. The base of transistor 51 is connected via feedback resistor 43 (which is shunted by feedback capacitor 46) and resistor 40 to this point of positive potential.

The collector of transistor 51 is connected via capacitor 47 to the base of transistor 52. The emitters of transistors 51 and 52 are connected together through resistor 45 to ground. The junction of capacitor 47 and the base of transistor 42 is connected via resistor 42 to the point of positive potential. The collector of transistor 52 is connected through resistor 40 to this point of potential.

An input signal is applied between the input terminal and ground. An output signal appears between the collector of transistor 51 and ground.

The input signal is an encoded signal having two positive going pulse components diodes which are produce in time sequence, one immediately following the other. The duration of each component is separately varied whereby the input signal is of pulse duration modulation type.

Figure 2:
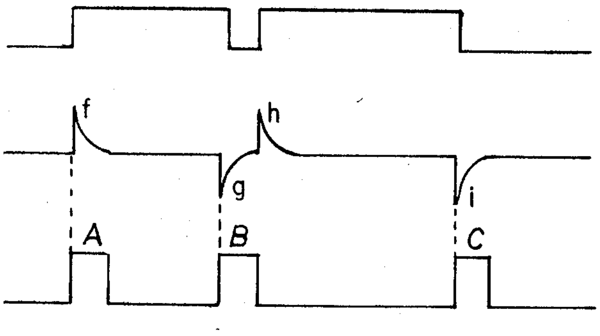
FIG. 2 illustrates certain wave forms used in explaining the operation of my invention.

The purpose of my invention is to convert the input signal into an output signal of pulse position modulation type. To this end, my invention derives from the input signal three like positive pulses *a*, *b* and *c* in FIG. 2, wherein the space (i.e., the elapsed time) between the leading edges of pulses *a* and *b* is proportional to the duration of the first component (*d*) of the input signal and the space between the leading edges of pulses *b* and *c* is proportional to the duration of the second component (*e*) of the input signal.

As the input signal is received, the components are differentiated by the capacitor 50 and resistor 49 to produce first a positive going spike *f* then a pair of spikes, negative spike *g* and positive spike *h* and finally a negative going spike *i*.

These spikes are used to trigger the one shot multivibrator constituted by transistors 51 and 52. Transistor 51 is normally non-conducting while transistor 52 is normally fully conducting.

Under these conditions, the positive spike *f* passes through diode to the transistor 51 to render it conductive momentarily whereby transistor 52 is momentarily cut off and pulse a is produced. The duration of this pulse is established by the internal time constants of the circuit.

The negative spike *g* then passes through the other diode to transistor 51 to render it conductive momentarily and repeat the above process to produce pulse *b*.

Because of the reversal of polarities of the diodes, spike *h* is blocked from the passage used by spike *g* and cannot influence the multivibrator action.

Thereafter negative spike *i* causes the same operation as spike *g* and pulse *c* is produced.

It can thus be seen that my invention has converted a pulse duration modulation type signal to a pulse position modulation signal.

While I have described my invention with particular reference to the drawings and to specific embodiments, my protection is to be limited only by the terms of the claims that follow.

I claim:

1. Apparatus responsive to a pulse duration modulation incoming signal having first and second time displaced pulse components of the same polarity but independently variable in duration to produce a pulse train of three pulses of the same polarity, the first time period between the leading edges of the first and second pulses in the train being proportional to the duration of the first component, the second time period between the leading edges of the second and third pulses in the train being proportional to the duration of the second component, said apparatus comprising:

a differentiation network responsive to the incoming signal to differentiate same to produce a first unidirectional spike of selected polarity, then a pair of spikes, the first spike in the pair having reversed polarity, the second spike in the pair having said selected polarity, and finally an additional spike of said reversed polarity, the period between the first spike and the first spike in the pair being equal to the duration of the first component, the period between the first spike in the pair and the additional spike being equal to the duration of the second component;

A normally non-conductive one shot multivibrator which when triggered into conduction produces an output pulse of fixed duration, this fixed duration being much less than the duration of any of said pulse components; said multivibrator having a pair of transistors with base and collector electrodes cross connected; and means coupled between said network and the multivibrator to pass said first spike, the first spike in the pair and the additional spike to said multivibrator in such manner as to cause each of the said passed spikes to trigger the multivibrator into conduction whereby said pulse train is produced, said means passing the second spike in the pair to the multivibrator in such manner as to have no effect on conduction thereof, the means including a first rectifier connected between the output of the network and the base electrode of one transistor and further including a second rectifier coupled between the output of the network and the collector electrode of said one transistor, said rectifiers having reversed polarities.

* * * * *